United States Patent [19]
Monnich

[11] 3,727,023
[45] Apr. 10, 1973

[54] DRIVER FOR BORING BAR FOR ELECTRIC DISCHARGE MACHINE

[76] Inventor: Carl Eugene Monnich, 9915 McBroom Street, Sunland, Calif. 91040

[22] Filed: June 16, 1971

[21] Appl. No.: 153,609

[52] U.S. Cl. ............................ 219/69 V, 219/69 E
[51] Int. Cl. ........................... B23p 1/08, B23p 1/12
[58] Field of Search ......................... 219/69 E, 69 V

[56] References Cited

UNITED STATES PATENTS

| 2,773,968 | 12/1956 | Martellotti et al. | 219/69 V |
| 3,125,664 | 3/1964 | Pfau | 219/69 V |

Primary Examiner—R. F. Staubly
Attorney—Forrest J. Lilly

[57] ABSTRACT

A device for rotary drive of a boring bar in an electric discharge boring machine. A head is rotated on a fixed axis and seats an eccentric on an axis eccentric to the axis of rotation of the head. The eccentric mounts a boring bar on an axis which is laterally offset from the center of the eccentric, and ormally concentric with the axis of the head. Rotary adjustment of the eccentric relative to the head adjusts the diameter of the hole formed by the boring bar by linearly proportionate increments.

2 Claims, 5 Drawing Figures

PATENTED APR 10 1973

3,727,023

INVENTOR.
CARL EUGENE MONNICH
BY Forrest J. Lilly
ATTORNEY

DRIVER FOR BORING BAR FOR ELECTRIC DISCHARGE MACHINE

FIELD OF THE INVENTION

This invention relates generally to a driver for an EDM (electric discharge machine) boring bar, having the capability of boring holes of variable radius using a boring bar of a fixed radius.

BACKGROUND OF THE INVENTION

Boring operations are now sometimes carried out, in the boring of very hard metals, such as titanium, by so-called EDM machines, which rotate an electrically conductive boring bar into the work piece while the two are immersed in a liquid dielectric. The two are in an electrical circuit, and owing to an electric discharge therebetween, the rotating bar bores a hole into the work. If the boring bar is cylindrical in form, and rotates on its center axis, the hole will be substantially of the radius of the boring bar. If the drill's axis is eccentric to the axis of rotation, the hole that will be drilled will have as its radius the maximum distance from the axis of rotation to the periphery of the boring bar. The purpose of the present invention is to provide a driver, between the drive motor and boring bar, that is adjustable by sensible discrete steps of uniform size to produce substantially linearly proportionate increases in the hole size to be made by a given boring bar. It is a purpose to provide adjustment steps throughout 90° of relative rotation of two adjustable parts, with a substantially linear scale, capable of being divided into (if desired) as many as say 90 increments, with each degree representing a sensible increment of hole size increase.

BRIEF SUMMARY OF THE INVENTION

According to a present preferred embodiment of the invention, the device has a directly power driven primary driver disc, rotatable on a fixed axis of rotation, which is also the axis of rotation of the boring bar. The primary driver has a round hole, whose center axis is offset from the fixed axis of rotation by a predetermined distance. In this hole is an eccentric snugly fitted for relative adjustment rotation therein. The eccentric, in turn, has a hole in it, in an eccentric position therein, with its center on the fixed axis of rotation of the driver disc.

Positioned in or by this last mentioned hole, or on the center axis thereof, is the boring bar. If now, with the parts in this position, i.e., the geometric center of the boring bar aligned with the fixed driver axis, the boring bar will be rotated on its geometric center. Now, if the eccentric disc is rotated through a predetermined angle relative to the driver disc, the geometric center of the hole in the eccentric and the boring bar therein, are swung in an arc about the center of the eccentric; but the center of rotation of the boring bar is still the fixed axis of rotation of the driver disc. The boring bar, therefore, rotates about an axis eccentric to its geometric center, and hence turns on an incrementally increased radius, so that it bores a larger hole. Moreover, as may easily be proved graphically, the progressive increments of increased boring radius have a substantially linear ratio to equal increments of relative angular adjustment rotation of the eccentric to the driver disc. A substantially linear scale is thus provided, with no crowding within the established 90° range of adjustability.

DESCRIPTION OF THE DRAWINGS

In the drawings, showing a present preferred embodiment of the invention.

Figure 1:
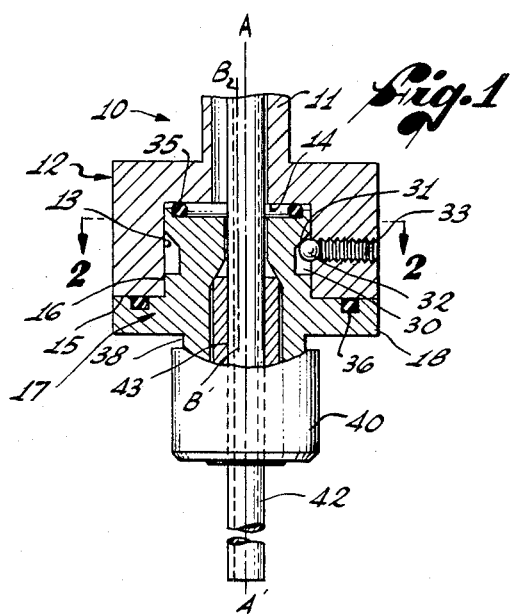
FIG. 1 is a longitudinal medial section through the eccentric driver of the invention.

In the drawings, the boring bar driver is designated generally at 10, and comprises a hollow cylindrical stem 11, adapted for reception and locking in a collet or chuck, understood to be rotated on its longitudinal axis A—A' by a stationarily mounted electrical discharge machine, not shown, powered by a prime mover which is generally an electric motor, also not shown. The stem integrally and concentrically joins a cylindric eccentrically bored drive head or cup 12, typically 2 inches in diameter. Thus the head 12 has a blind, eccentrically located bore 13, an inner transverse wall face 14, and an annular or ring shaped transverse face 15.

Received in the bore 13, with a close and relative snug but smoothly rotative fit is a machined cylindrical pin or boss 16 of an eccentric 17. This pin 16 is in an eccentric position relative to the axis A—A', which is the axis of driver rotation, i.e., the axis about which all rotation must take place. The offset distance from the axis of rotation A—A' to the center axis B—B of the eccentric hole 13 and the eccentrically located pin 16 is designated at $e$ in the drawings.

Integral with the outside end of pin 16 is a flange or disc 18, which confronts and is placed immediately adjacent the face 15 on head 12. The eccentric pin 16 and the flange 18 comprise a driven head of the driver 10. The flange 18 is coaxial with the head 12 when in the position of FIG. 1, and of the same diameter; and an arrow 20 and scale 21 are placed opposite one another, one on the periphery of the flange 18, and the other on the head 12, immediately adjacent to the periphery of the flange 18. As here shown, the scale 21 is on the flange 18, and the arrow on the head 12. The scale may have 1° divisions, and have a range of 0°–90°. The position of FIGS. 1 and 2 is the 0° position and the scale may run in either direction for 90°.

The pin 16 has an annular groove 30, with one inclined side face 31, and a set of balls 32, held in place by set screws 33 set into the side wall of the cup shaped head, hold the pin 16 in position in bore 13, with a snug but easy sliding fit between the flange 18 and the head surface 15. To prevent entry of dielectric into the interior of the device, O-ring seals 35 and 36 are placed as indicated.

Figure 3:
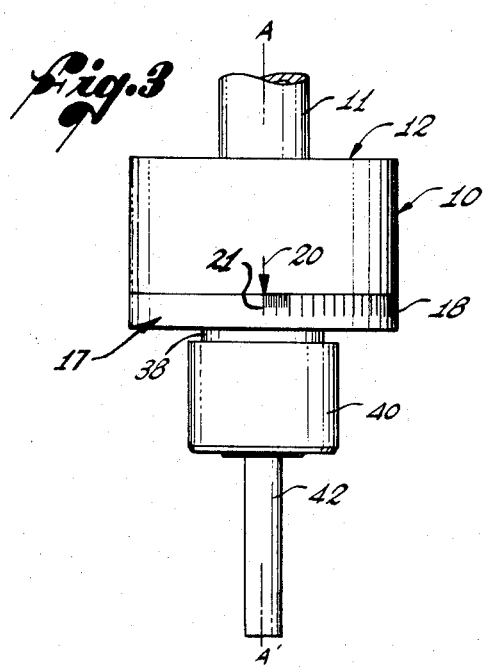
FIG. 3 is a side elevational view of the driver, looking at the driver from the right in FIG. 1.
Figure 2:
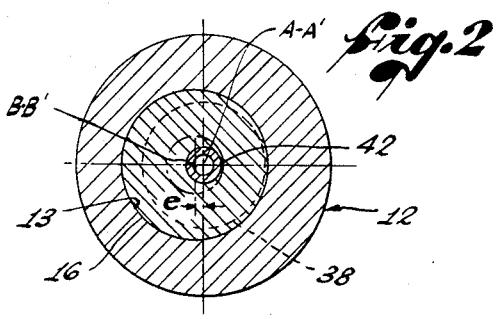
FIG. 2 is a transverse section on line 2—2 of FIG. 1, FIGS. 1 and 2 both showing the driver in the same 0° position of adjustment.

A tubular stem 38 extends downwardly from eccentric 17, concentric with the axis of rotation A—A' when the parts are in the 0° setting position of FIGS. 1, 2, and 3. It will be appreciated that as eccentric 17 is rotated relative to head 12, away from the 0° setting of FIGS. 1 and 2, the stem 38 will progressively move off-center relative to the axis of rotation A—A'. The boring bar is fixed concentrically relative to the stem 38, as presently described, and accordingly also moves off-center relative to axis A—A', and thus progressively sweeps a larger and larger circle.

The stem 38 carries a means for receiving and clamping a boring bar, i.e., a chuck or collet represented diagrammatically at 40, and the cylindrical boring bar is indicated at 42, snugly received in the bore 43 in pin 16 and stem 38. The boring bar may be a solid cylinder, but for a special purpose to be mentioned later, it may be a tube, and is so illustrated in FIG. 1.

Figure 4:
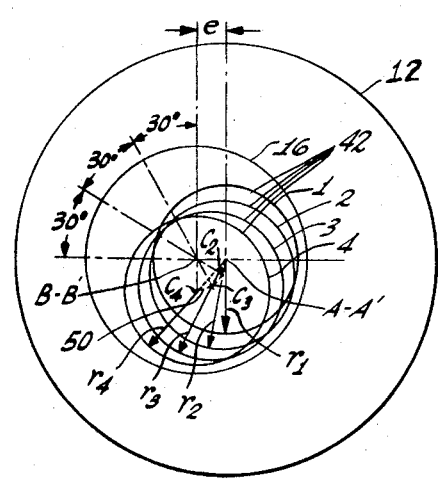
FIGS. 4 and 5 are diagrams demonstrating graphically the linearity of bore hole diameters with equal angular increments of relative rotative adjustment of the driver.
Figure 5:
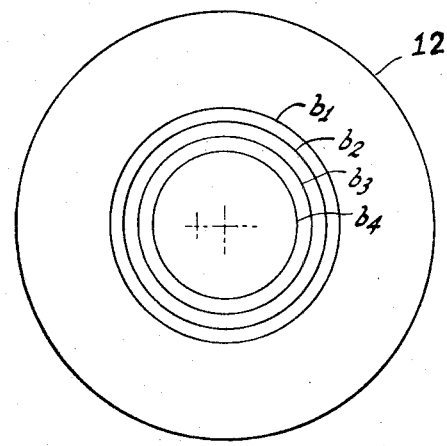

Reference is next directed to the exaggerated diagrams of FIGS. 4 and 5, and first to FIG. 4.

The head 12, and eccentric pin 16, are represented only in the 0° position of FIG. 4, and the boring bar 42 is shown at eccentric settings of 0°, 30°, 60°, and 90°, designated 1, 2, 3, 4, respectively. As the eccentric pin is manually rotated by the rim 18 relative to the drive head 12 through these settings, the center point of the stem 38 and boring bar turns through a 90° arc 50, about the eccentric axis B—B', at a radius equal to the eccentric offset distance $e$. The center point of the bar 42 thus moves step-by-stem around axis B—B' from the position of coincidence with axis A—A' through equal angular increments of 30°, to successive center point positions $c_2$, $c_3$, and $c_4$. Successive radii $r_1$, $r_2$, $r_3$ and $r_4$ of the boring bar 42 will be seen to correspond to the center successive center positions A—A', $c_2$, $c_3$, and $c_4$. The maximum or far side distances from the axis of rotation A—A' to the circles swept by the boring bar while positioned relative to the head 12 with the center of the boring bar at the successive positions A—A', $c_2$, $c_3$, and $c_4$ has been measured, and taken, in FIG. 5, as successive radii of circles $b_1$, $b_2$, $b_3$ and $b_4$ swept by the boring bar 42 at successive center positions A—A', $c_2$, $c_3$ and $c_4$ of the boring bar.

As will be seen in FIG. 5, the distances between circles $b_1$, $b_2$, $b_3$ and $b_4$ are remarkably uniform, and denote a virtually linear relationship between equal divisions on scale 21 and hole sizes that will be drilled by the boring bar. In actual practice, of course, the divisions are preferably divided into 1° instead of 30° intervals; but the linearity demonstrated for 30° intervals proves that linearity will hold for uniform angular intervals of any size.

During operation, there is no tendency for the angular setting of the eccentric 16 in the head 12 to be disturbed, and only light friction between these parts serves to hold them at any given fine setting. This light friction thus enables the parts 12 and 18 to be easily manually twisted relative to one another for adjustment, yet maintains the parts in adjusted position during operation.

The bore through the boring bar is useful to carry a circulation fluid which, discharged into the dielectric at the lower end of the boring bar, promotes turbulence and circulation of the dielectric to keep it clear of products of the electrolytic current flow between the boring bar and the work during operation.

Attention is here directed to the fact that the driver of the invention is reversible, or subject to inversion, in that the stem 38 may be driven, and the stem 11 equipped with the electrode holding means. Results with this inversion are equivalent to those with the device used as here shown. This feature of inversion is an equivalent within the scope of the appended claims.

The preferred embodiment illustrated in the drawings has an eccentricity or offset $e$ somewhat larger, for ease of understanding, than would be ordinary in practice. A typical practice example would have a head 12 2 inches in diameter, and an offset distance of 0.005 inch. Each degree of rotation of the eccentric 16 relative to the head 12 then produces a change in hole size of 0.00016 inch.

I claim:

1. A rotary driver for a rotary boring bar of an electric discharge boring machine, or the like, comprising:

a boring bar drive head and a boring driven head having, respectively, a fixed longitudinal axis of rotation, and a longitudinal axis of rotation which may coincide in one position of adjustment with said fixed axis to be parallel to and shortly spaced from said fixed axis by variable distances in other positions of adjustment, said heads being positioned opposite to one another with their adjacent sides substantially in a plane perpendicular to said axes, said sides having confronting annular faces substantially in said plane rotatably adjustable relatively to one another, said drive head having a hollow drive stem concentric with said fixed axis of rotation thereof to receive, with clearance, a boring bar, one of said heads having a cylindrical eccentric bore extending inwardly therein, circumscribed by its said annular face, and having a center axis eccentric to said fixed axis by a predetermined offset distance, and the other of said heads having a circular eccentric projecting therefrom, circumscribed by its said annular face, and received in said bore with a light frictional but manually rotative fit, said eccentric having a center axis which is eccentric by said same offset distance from said fixed axis, means mounting a cylindrical boring bar on said driven head on an axis laterally offset from the center axis of said eccentric bore and eccentric by said offset distance, said last mentioned axis coinciding with said fixed axis in one position of rotation of said eccentric relative to the one of said heads that contains said eccentric bore, said eccentric bore terminating at its inner end in an annular shoulder, and there being a reduced bore extending from said shoulder and remainder of the way through said driver head for accommodation of said boring bar, a sealing ring between said annular faces, and a sealing ring between said shoulder and the inner end of said eccentric, said sealing rings excluding dielectric from the interior of the drive and driven heads.

2. The subject matter of claim 1, wherein said eccentric is encircled by an annular groove whose edge nearest the inner end of the eccentric is formed on an incline, and including a screw threaded in a transverse bore in the head surrounding the eccentric, and a ball engaged by said screw and held thereby against said inclined groove edge.

* * * * *